United States Patent
Liu et al.

(10) Patent No.: US 9,128,576 B2
(45) Date of Patent: Sep. 8, 2015

(54) CAPACITIVE TOUCH PANEL AND METHOD FOR MANUFACTURING THE SAME

(71) Applicant: ELAN MICROELECTRONICS CORPORATION, Hsin Chu (TW)

(72) Inventors: Nan-Jung Liu, Zhubei (TW); Chia-Jui Huang, Jincheng Township, Kinmen County (TW)

(73) Assignee: ELAN MICROELECTRONICS CORPORATION, Hsin Chu (TW)

( * ) Notice: Subject to any disclaimer, the term of this patent is extended or adjusted under 35 U.S.C. 154(b) by 256 days.

(21) Appl. No.: 13/970,273

(22) Filed: Aug. 19, 2013

(65) Prior Publication Data
US 2014/0124351 A1  May 8, 2014

(30) Foreign Application Priority Data
Nov. 7, 2012 (TW) .............................. 101141266 A

(51) Int. Cl.
G06F 3/045  (2006.01)
G06F 3/044  (2006.01)
G06F 3/042  (2006.01)

(52) U.S. Cl.
CPC ............... *G06F 3/044* (2013.01); *G06F 3/042* (2013.01); *Y10T 29/49105* (2015.01)

(58) Field of Classification Search
CPC ........ G06F 3/042; G06F 3/0421; G06F 3/044
USPC .................... 345/173–178; 178/18.01–18.07, 178/20.01–20.04
See application file for complete search history.

(56) References Cited

U.S. PATENT DOCUMENTS

| | | | |
|---|---|---|---|
| 8,741,424 B2* | 6/2014 | Takahashi et al. | 428/195.1 |
| 8,817,224 B2* | 8/2014 | Saito et al. | 349/187 |
| 2013/0256863 A1 | 10/2013 | Ito | |
| 2014/0253824 A1* | 9/2014 | He | 349/12 |
| 2015/0021153 A1* | 1/2015 | Stone | 200/5 R |

FOREIGN PATENT DOCUMENTS

| | | |
|---|---|---|
| TW | M389412 U1 | 9/2010 |
| TW | 20113316 A1 | 10/2011 |
| TW | 201221536 A1 | 6/2012 |
| TW | 201232367 A1 | 8/2012 |

* cited by examiner

*Primary Examiner* — Vijay Shankar
(74) *Attorney, Agent, or Firm* — Muncy, Geissler, Olds & Lowe, P.C.

(57) ABSTRACT

A method for manufacturing a capacitive touch panel has steps of providing a substrate, delimiting at least one preset zone on the substrate, forming multiple first-axis sensing units and multiple second-axis sensing units on one of the surfaces of the substrate, forming at least one set of connection circuit and at least one die pad on the other surface of the substrate, forming multiple first conductive vias through the substrate with at least one of the first conductive vias located within the preset zone for the second-axis sensing units to be mutually connected by the first conductive vias to form multiple second-axis sensing lines, and bonding a controller with an LQFP (Low Profile Quad) package or a TQFP (Thin Quad Flat) package on the at least one die pad within the preset zone to ensure enough space available to form the at least one first conductive via on the bottom of the controller.

14 Claims, 11 Drawing Sheets

CAPACITIVE TOUCH PANEL AND METHOD FOR MANUFACTURING THE SAME

BACKGROUND OF THE INVENTION

1. Field of the Invention

The present invention relates to a capacitive touch panel and a method for manufacturing the same, and more particularly to a capacitive touch panel and a method for manufacturing the same capable of reducing material cost and accelerating production speed.

2. Description of the Related Art

With reference to FIG. 7A, a conventional capacitive touch panel is shown. The conventional capacitive touch panel has/comprises multiple first-axis sensing lines L1 (along X axis) and multiple second-axis sensing lines L2 (along Y axis) formed on one surface of a printed circuit board (PCB) 70 and intersecting one another. With reference to FIG. 8, multiple conductive traces 100 and a control circuit are formed on the other opposite surface of the PCB 70. The control circuit has a controller 110. The controller 110 has multiple pins, and each pin is soldered to one end of a corresponding conductive trace 100. Each of the first-axis sensing lines L1 and the second-axis sensing lines L2 has a conductive via P formed at an end thereof and penetrating through the two opposite surfaces of the PCB 70 to connect with one of the conductive traces 100. Hence, the controller 110 can transmit driving signals to and receive sensing signals from the first-axis sensing lines L1 and the second-axis sensing lines L2 through the corresponding conductive traces 100 and conductive vias P.

As the foregoing capacitive touch panel must have the first-axis sensing lines L1 and the second-axis sensing lines L2 formed on the same surface of the PCB 70, the most direct approach is to adopt a multilayer circuit board. With reference to FIG. 7B, an inner connection line 82 is connected between two of multiple second-axis sensing units 81 of each second-axis sensing line L2 such that the first-axis sensing units of the first-axis sensing lines L1 and the second-axis sensing units of the second-axis sensing lines L2 are formed on the same surface of the multilayer circuit board. However, the cost of multilayer circuit board is high, and a multilayer circuit board is thicker than a double-layer circuit board. To reduce thickness of the capacitive touch panel, a capacitive touch panel with a double-layer circuit board is developed. The double-layer circuit board has the first-axis sensing lines L1 and the second-axis sensing lines L2 formed on the same surface thereof. With reference to FIG. 9A, a manufacturing method of the capacitive touch panel has the following steps.

Provide a double-layer substrate 70' having two opposite surfaces.

Form multiple first-axis sensing lines L1 arranged in parallel rows along a first-axis (X) direction on a surface of the double-layer substrate 70', multiple second-axis sensing units 81 arranged in parallel columns along a second-axis (Y) direction and aligned in each row located between adjacent two of the first-axis sensing lines L1, and multiple connection circuits 100 on the other opposite surface of the double-layer substrate 70'.

Fully coat a layer of green paint 90 on the surface of the double-layer substrate 70' having the first-axis sensing lines L1 and the second-axis sensing units 81 thereon as shown in FIG. 9B, except that two ends 811 of each second-axis sensing unit 81 are left uncoated.

Print multiple carbon conductors 82' on the green paint 90 as shown in FIG. 9C. Each carbon conductor 82' is connected between two adjacent ends 811 of adjacent two of the second-axis sensing units 81 so that the second-axis sensing units 81 aligned in the second-axis direction form multiple second-axis sensing lines L2.

Solder a quad flat no leads (QFN) controller 110 onto the surface of the double-layer substrate 70' having the connection circuits 100 to connect with one end of each connection circuit 100 for the QFN controller 110 to connect to the first-axis sensing lines L1 and the second-axis sensing lines L2 through the connection circuits 100. In general, multiple conductive vias P are formed through the double-layer substrate 70 and corresponding to locations of the first-axis sensing lines L1 and the second-axis sensing lines L2. The connection circuits 100 are connect to the first-axis sensing lines L1 or the second-axis sensing lines L2 through the conductive vias P.

In the foregoing conventional capacitive touch panel, the first-axis sensing lines and the second-axis sensing lines are formed on one surface of the double-layer circuit board by leaving the two ends of each second-axis sensing unit in each second-axis sensing line uncoated by the green paint, and then connecting the second-axis sensing units with the carbon conductors to form the second-axis sensing line. As the carbon conductors and the first-axis sensing lines are insulated by green paint between them, an electrically insulating structure of bridging conductor is completed. As long as the first-axis sensing lines and the second-axis sensing lines can be formed on the double-layer substrate, such type of capacitive touch panel should be thinner than those having multilayer circuit board. However, such conventional capacitive touch panel requires an additional manufacturing process (printing carbon conductors) besides the electroplating process for regular PCBs. As printing the carbon conductors involves high material cost and longer production time arising from complicated manufacturing processes, such as baking, hardening and the like, such conventional capacitive touch panel is not ideal for the sake of cost consideration.

Even though a conductive via P can be formed through one end of each of the first-axis sensing lines L1 and the second-axis sensing lines L2 on the double-layer substrate 70' and connected to a corresponding connection circuit 100, the second-axis sensing units having the corresponding conductive vias formed therethrough and connecting with the conductive vias to form a corresponding second-axis sensing line has the following limitations.

1. As the current controllers (hereafter called QFN controller) mostly pertain to the integrated circuits (IC) fabricated by a QFN packaging process, after a QFN controller is soldered on a circuit board, a bottom of a package of the QFN controller is almost flatly attached on a surface of the circuit board, and usually occupies an area covering several second-axis sensing units. Hence, there is almost no space between the bottom of the QFN controller and the surface of the circuit board available for the formation of the conductive vias except the area not occupied by the bottom of the QFN controller.

2. Automatic routing software is not applicable: As the carbon conductor connected between any adjacent two of the second-axis sensing units is formed on the surface having the connection circuits, the original connection paths between the connection circuits and the pins of the controller are subject to change, and also the area not occupied by the QFN controller needs to be identified. Accordingly, manual routing is needed instead and the time and complication for the routing design certainly increases.

SUMMARY OF THE INVENTION

An objective of the present invention is to provide a capacitive touch panel and a method for manufacturing the same, the method adopting double-layer PCB with reduced thickness and production cost.

To achieve the foregoing objective, the method for manufacturing a capacitive touch panel has steps of:

providing a substrate, and delimiting at least one preset zone on the substrate, wherein the substrate has two surfaces opposite to each other;

forming multiple first-axis sensing units and multiple second-axis sensing units on one of the surfaces of the substrate with each adjacent two of the first-axis sensing units connected with a first conductor trace for the first-axis sensing units aligned in a first-axis direction to form multiple first-axis sensing lines;

forming at least one set of connection circuit and at least one die pad on the other surface of the substrate, wherein the at least one die pad corresponds to the at least one preset zone;

forming multiple first conductive vias through the substrate, wherein at least one of the first conductive vias is located within the preset zone, and the second-axis sensing units are mutually connected by the first conductive vias to form multiple second-axis sensing lines; and bonding a controller with an LQFP (Low Profile Quad Flat) package or a TQFP (Thin Quad Flat) package on the at least one die pad within the preset zone.

To achieve the foregoing objective, the capacitive touch panel has a substrate, multiple first-axis sensing lines, multiple second-axis sensing units, multiple first conductive vias, and a controller with an LQFP package or a TQFP package.

The substrate has a first surface and a second surface, and delimits at least one preset zone. At least one set of connection circuit and at least one die pad are formed on the second surface of the substrate, and the at least one die pad corresponds to the preset zone.

The first-axis sensing lines are formed on the first surface of the substrate. Each first-axis sensing line is formed by multiple first-axis sensing units connected to one another.

The second-axis sensing units are formed on the first surface of the substrate.

The first conductive vias are formed through the substrate to correspond to the second-axis sensing units, and are connected to corresponding second-axis sensing units to form multiple second-axis sensing lines. At least one of the first conductive vias is located within the preset zone.

The controller with an LQFP package or a TQFP package is bonded on the at least one die pad and is connected with the at least one set of connection circuit.

From the foregoing description, the method for manufacturing the capacitive touch panel of the present invention forms the first-axis sensing units and the second-axis sensing units on one of the surfaces of the substrate, and bonds the controller with an LQFP package or a TQFP package on the other surface of the substrate. As a distance from the bottom surface of the package of the controller to adjacent pins is greater than a thickness of the portion of the first conductive vias protruding beyond a surface of the substrate, when the pins of the conductor traces are connected to the corresponding conductor traces, there is enough space on the bottom surface of the controller available to form conductive vias and form the second-axis sensing lines by the second-axis sensing units. It is unnecessary for the conductor traces connected with the first conductive vias on the bottom surface of the controller to be additionally routed, facilitating automatic PCB layout routing. Accordingly, the substrate of the present invention can also adopt double-layer substrate. In comparison with the capacitive touch panels using conventional double-layer substrate, the present invention can save the material cost of carbon conductors and eliminate the steps of baking and hardening the carbon conductors to shorten the production time.

Other objectives, advantages and novel features of the invention will become more apparent from the following detailed description when taken in conjunction with the accompanying drawings.

DETAILED DESCRIPTION OF THE INVENTION

With reference to FIGS. 1 to 5, a capacitive touch panel in accordance with the present invention has a printed circuit board (PCB) 1, and a controller 50 soldered onto the PCB 1, and a method for manufacturing the capacitive touch panel has the following steps.

Figure 1:
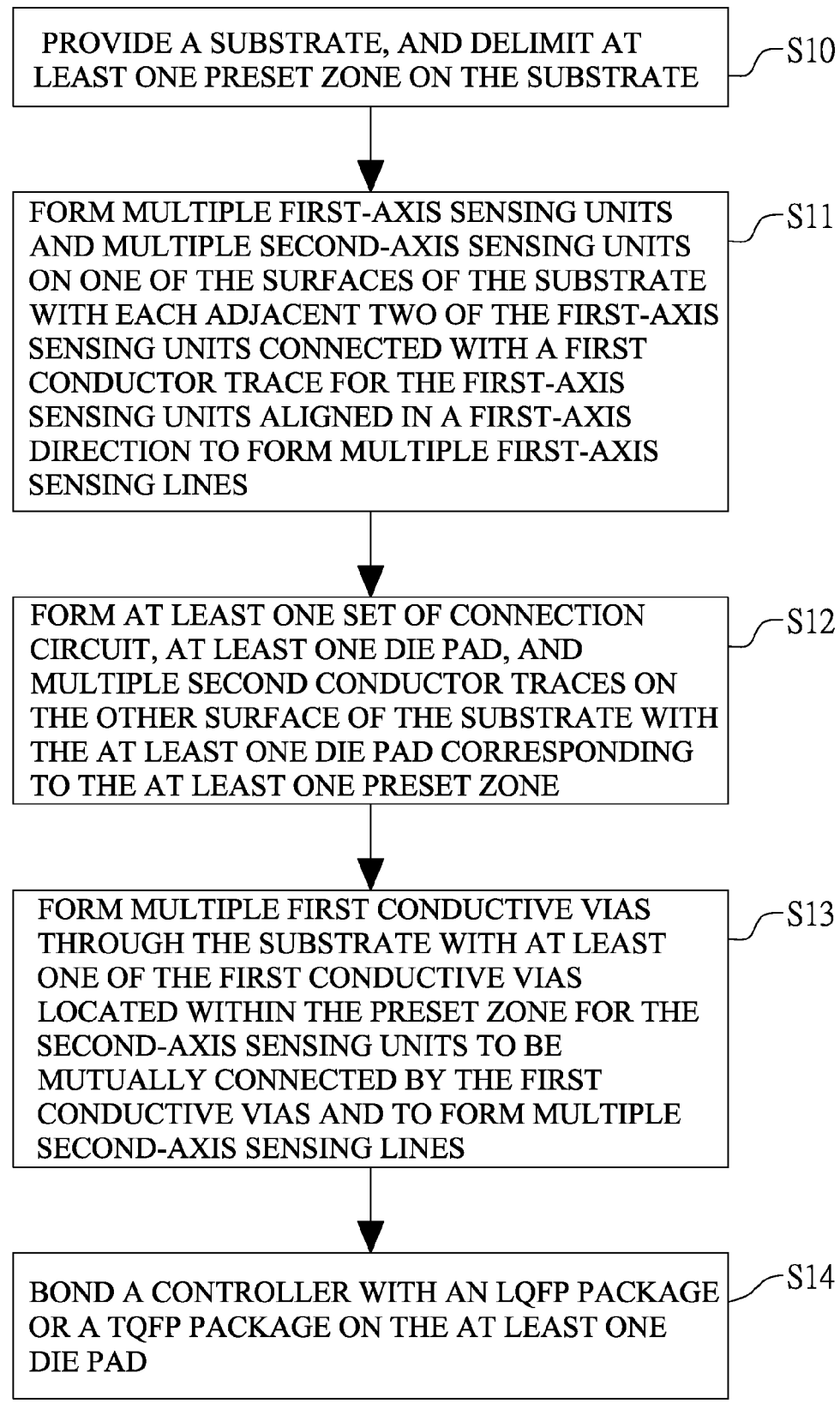
FIG. 1 is a flow diagram of a method for manufacturing a capacitive touch panel in accordance with the present invention.
Figure 2:
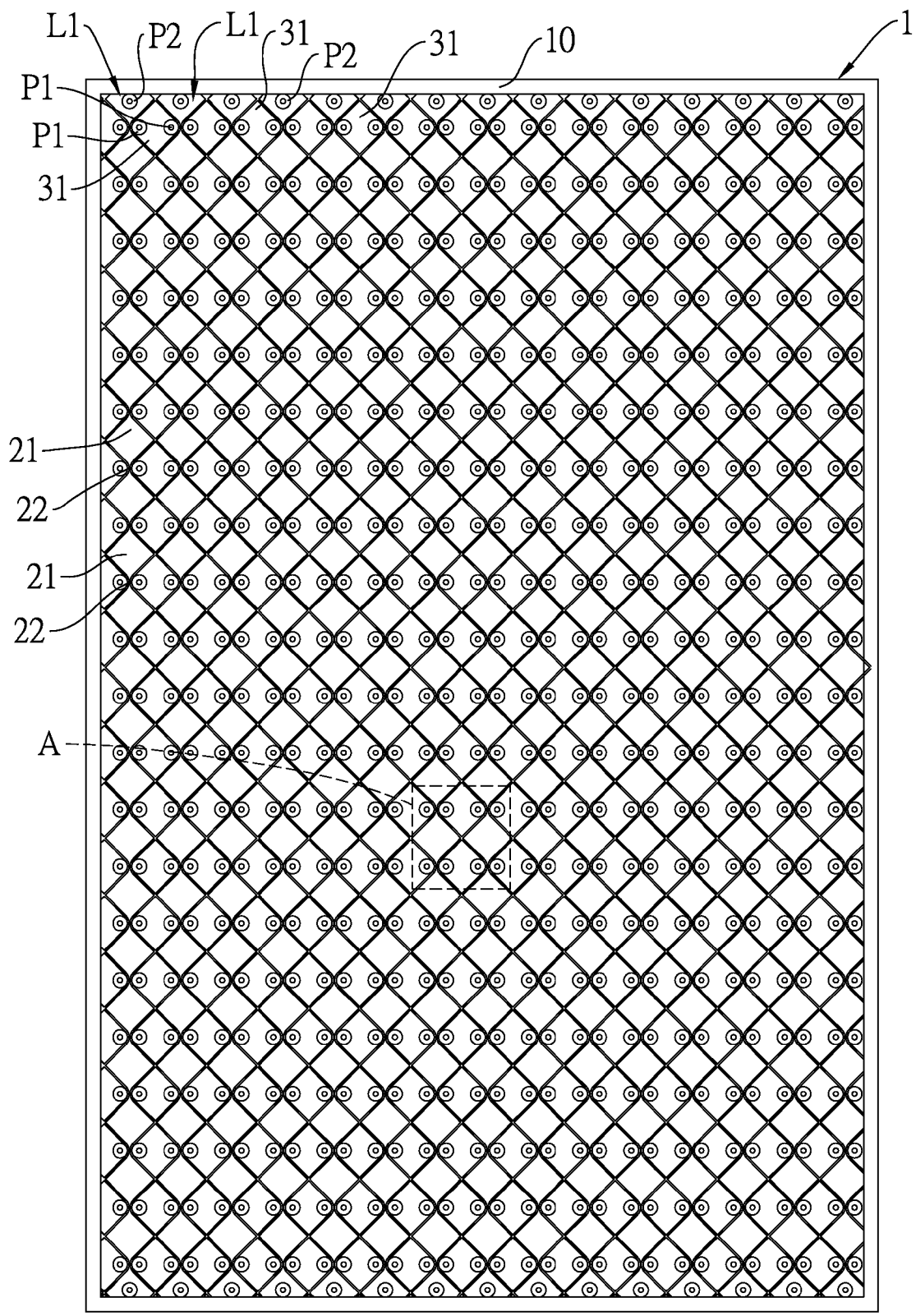
FIG. 2 is a top view of a capacitive touch panel in accordance with the present invention.
Figure 3:
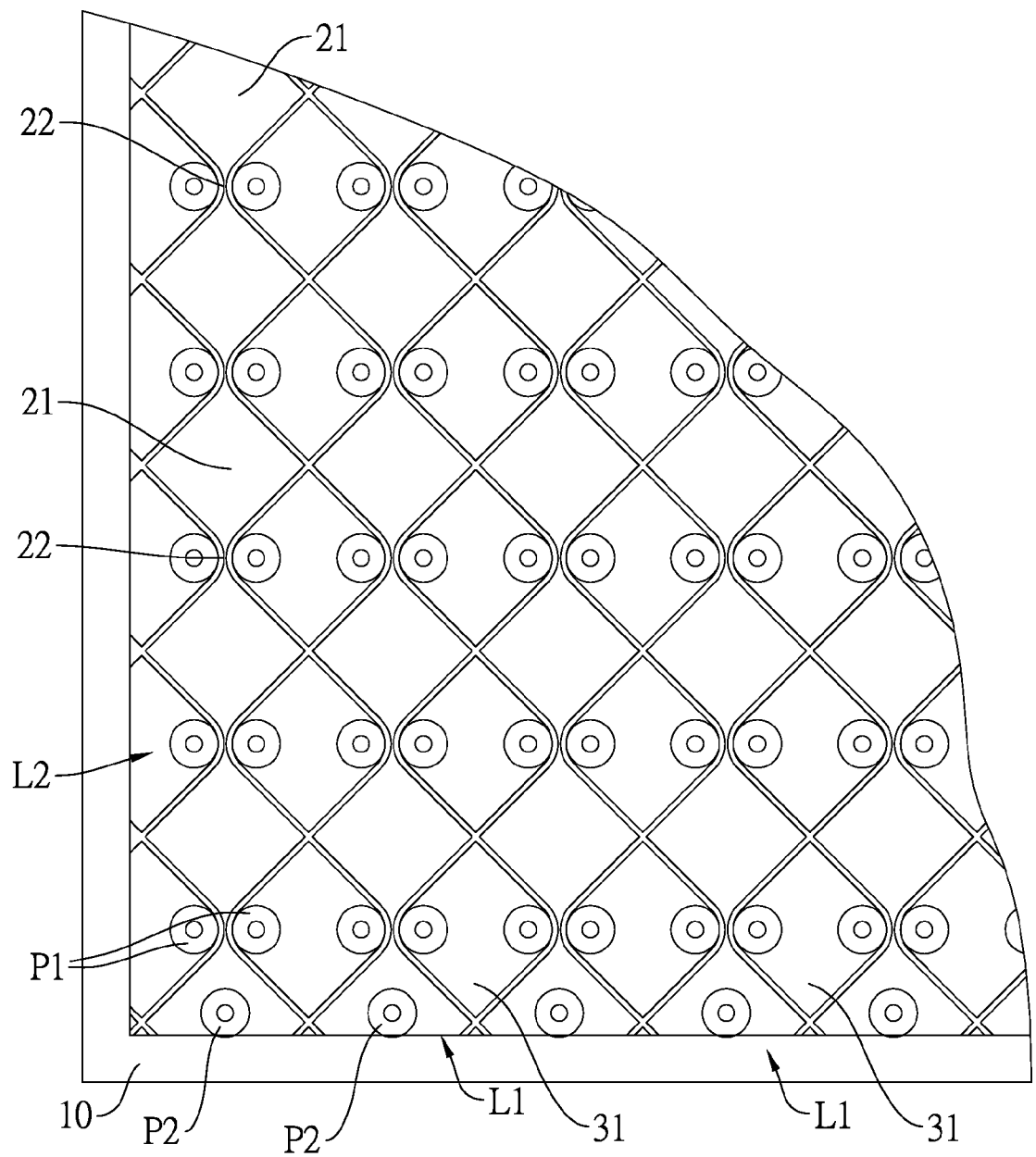
FIG. 3 is a partially enlarged top view of the capacitive touch panel in FIG. 2.

Step S10: Provide a substrate 10, and delimit at least one preset zone A on the substrate 10. With reference to FIGS. 2 and 3, the substrate 10 may be a double-layer substrate or a multilayer substrate. The substrate 10 has two opposite surfaces.

Step S11: Form multiple first-axis sensing units 21 and multiple second-axis sensing units 31 on one of the surfaces of the substrate 10 with each adjacent two of the first-axis sensing units 21 connected with a first conductor trace 22 for the first-axis sensing units 21 aligned in a first-axis direction to form multiple first-axis sensing lines L1.

Figure 4:
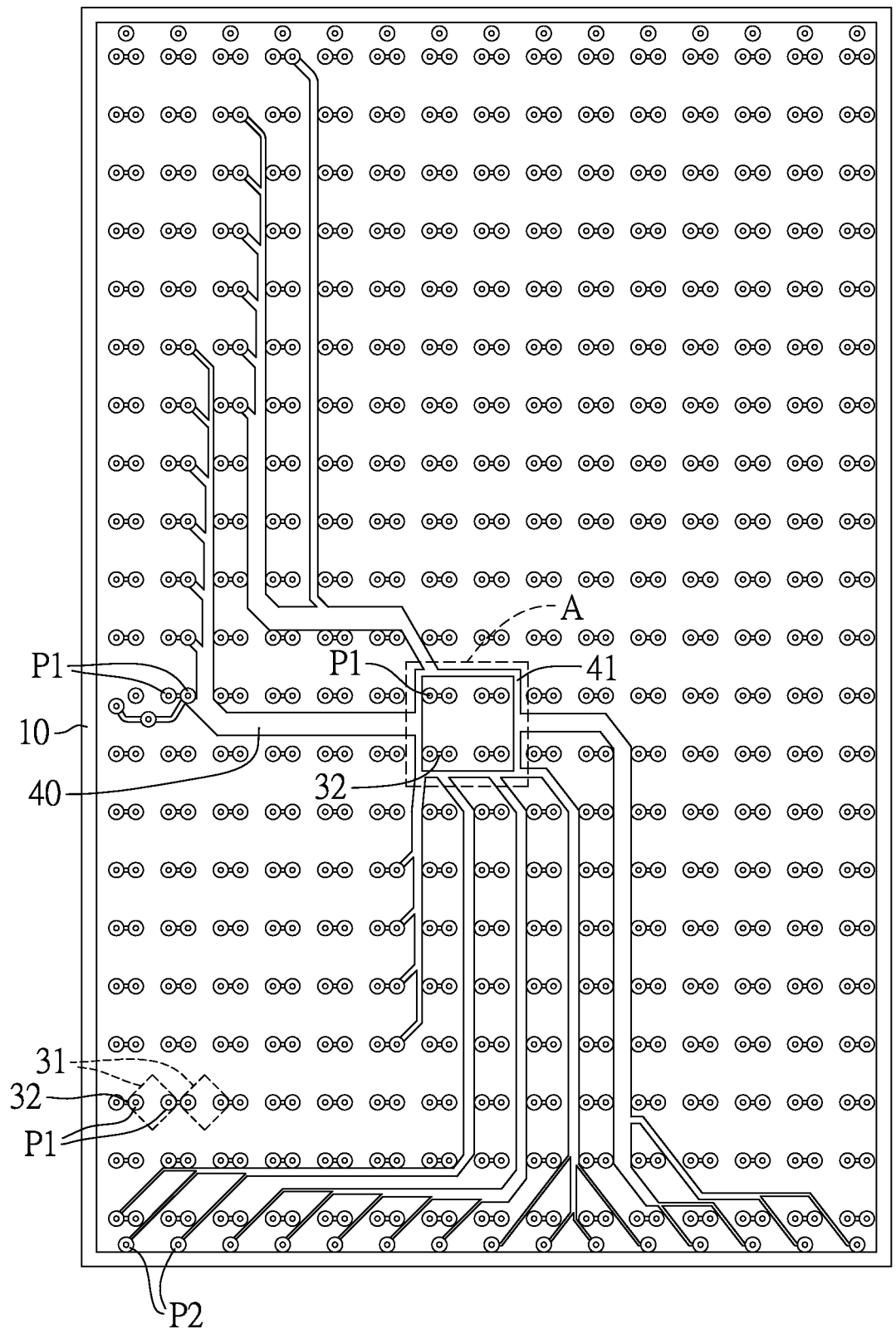
FIG. 4 is a bottom view of the capacitive touch panel in FIG. 2.

Step S12: Form at least one set of connection circuit 40, at least one die pad 41 and multiple second conductor traces 32 on the other surface of the substrate 10 as shown in FIG. 4. The at least one die pad 41 corresponds to the at least one preset zone A. One end of each of the at least one set of connection circuit 40 proximal to the preset zone A is connected to the at least one die pad 41.

Step S13: Form multiple first conductive vias P1 and multiple second conductive vias P2 through the substrate 10 using a plated through hole (PTH) process or a copper plated through hole (CPTH) process as shown in FIGS. 3 and 4. At least one of the first conductive vias P1 is located within the preset zone A. Multiple first conductive vias P1 are connected with corresponding second conductor traces 32 for the second-axis sensing units 31 to be mutually connected by the first conductive vias P1 and to form multiple second-axis sensing lines L2. Each second conductive via P2 is connected to one end of a corresponding first-axis sensing line L1 and one end of a corresponding set of connection circuit 40. By now, the fabrication of the double-layer PCB 1 is completed. The second conductive vias P2 are located on two edges of the substrate 10 along the first-axis direction.

Figure 5:
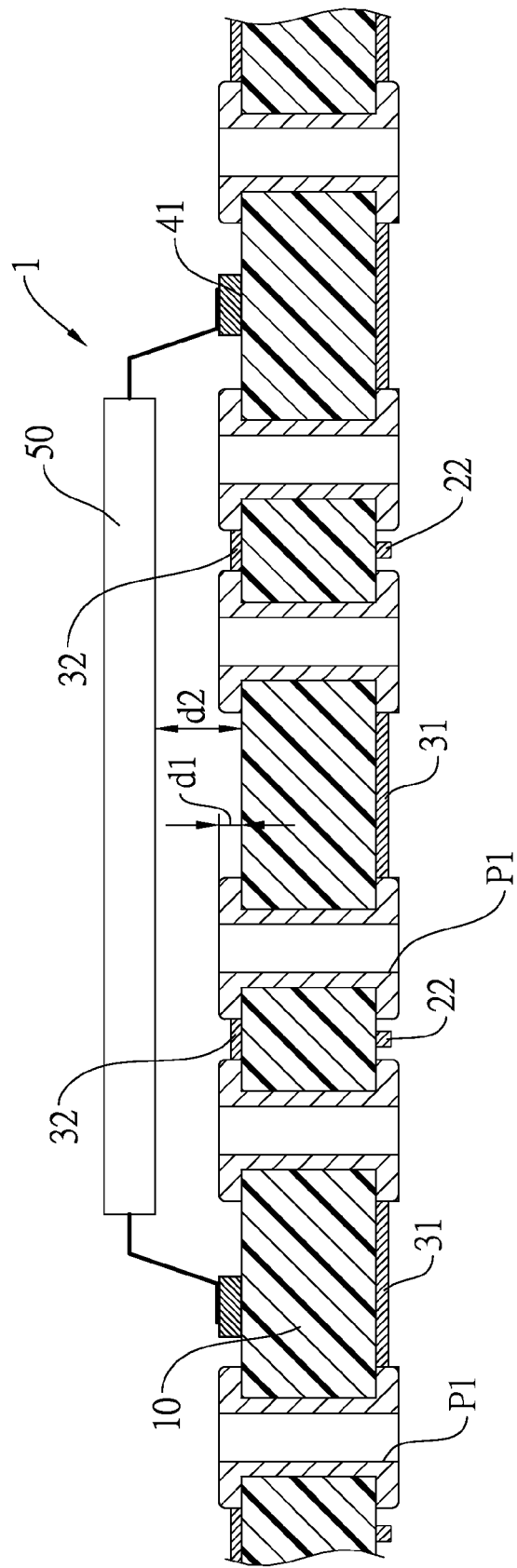
FIG. 5 is a side view in partial division of a first embodiment of a capacitive touch panel in accordance with the present invention.

Step S14: Bond a controller 50 with an LQFP (Low Profile Quad Flat) package or a TQFP (Thin Quad Flat) package (hereafter called LQFP controller or TQFP controller) on the at least one die pad 41 as shown in FIG. 5 to finish the production of the capacitive touch panel for the LQFP controller or the TQFP controller to be connected with the set of connection circuit 40. With further reference to FIGS. 2 and 4, the LQFP controller or the TQFP controller 50 can output driving signals to or receive sensing signals from the first-axis sensing lines L1 and/or second-axis sensing lines L2 through the corresponding set of connection circuits 40 and the corresponding second conductive vias P2. With further reference to FIG. 5, as the first conductive vias P1 are formed by the PTH process, each first conductive via P1 extends outwards from the two opposite surfaces of the double-layer substrate 10, and the protruding portion has a thickness about 0.035 mm. After the LQFP controller or LQFP controller 50 is soldered on the at least one die pad 41, a thickness d2 from a bottom surface of the package of the LQFP controller or TQFP controller 50 to the surface of the substrate 10 having the at least one die pad 41 is approximately 0.1 mm. Hence, there is enough space for forming at least one of the first conductive vias P1 corresponding to the bottom surface of the package of the LQFP controller or TQFP controller 50.

Figure 6:
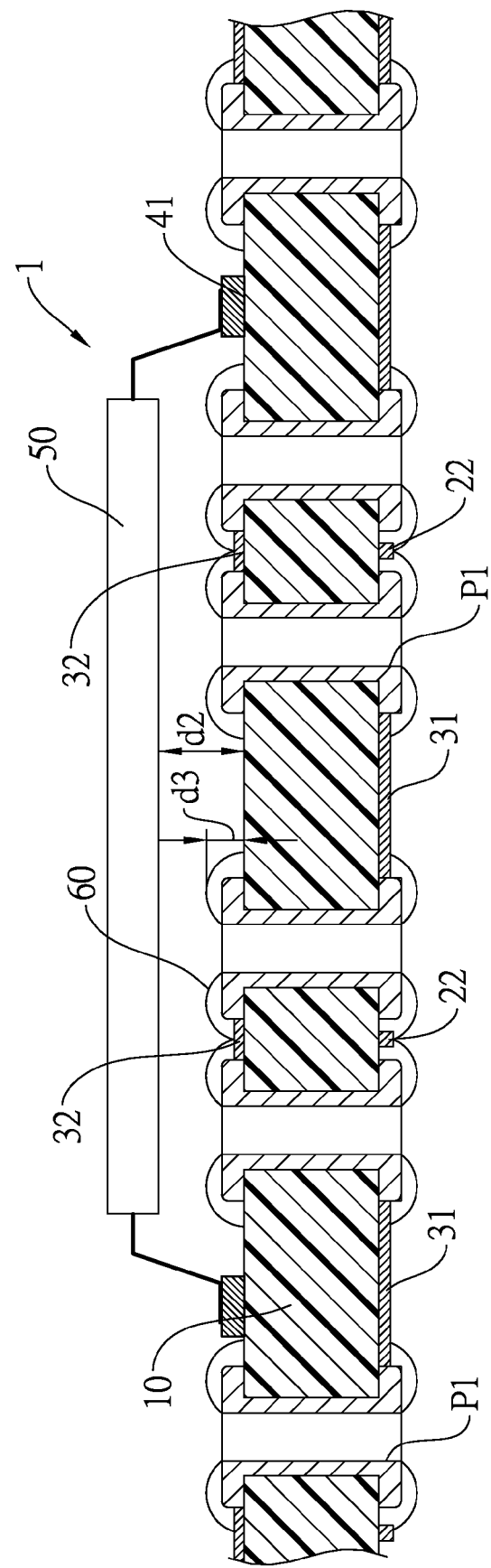
FIG. 6 is a side view in partial division of a second embodiment of a capacitive touch panel in accordance with the present invention.
Figure 7A:
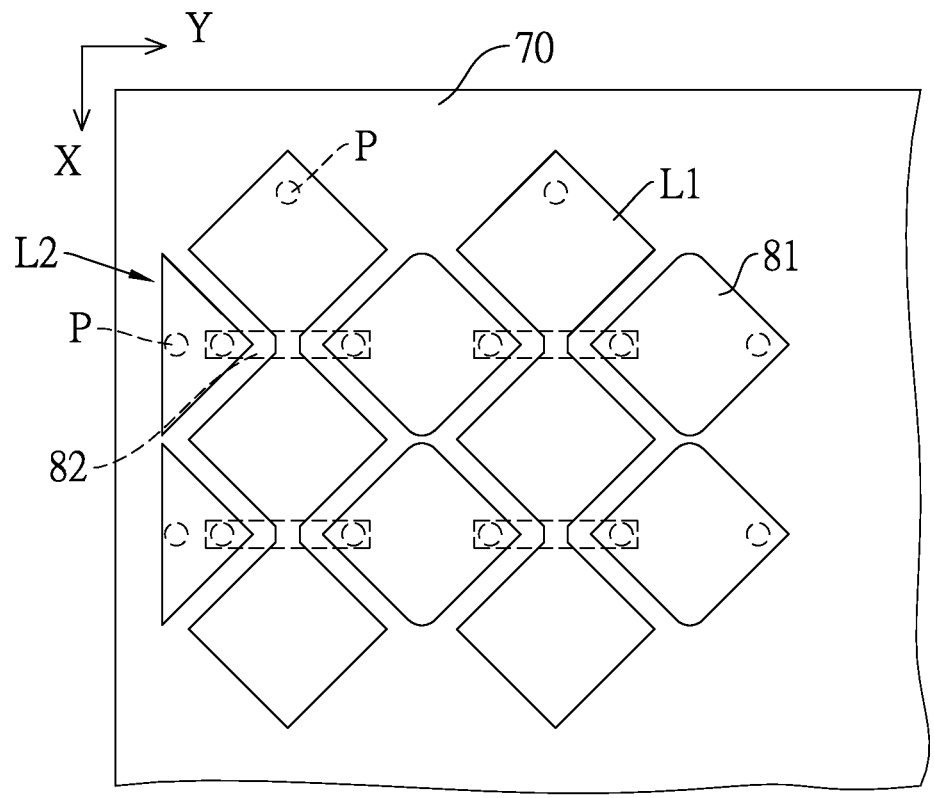
FIG. 7A is a partially enlarged top view of a conventional capacitive touch panel with a multilayer circuit board.
Figure 7B:
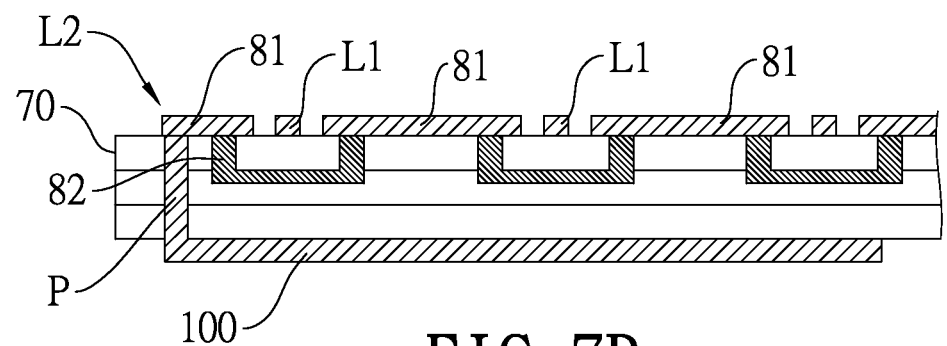
FIG. 7B is a cross-sectional side view of the conventional capacitive touch panel in FIG. 7A.
Figure 8:
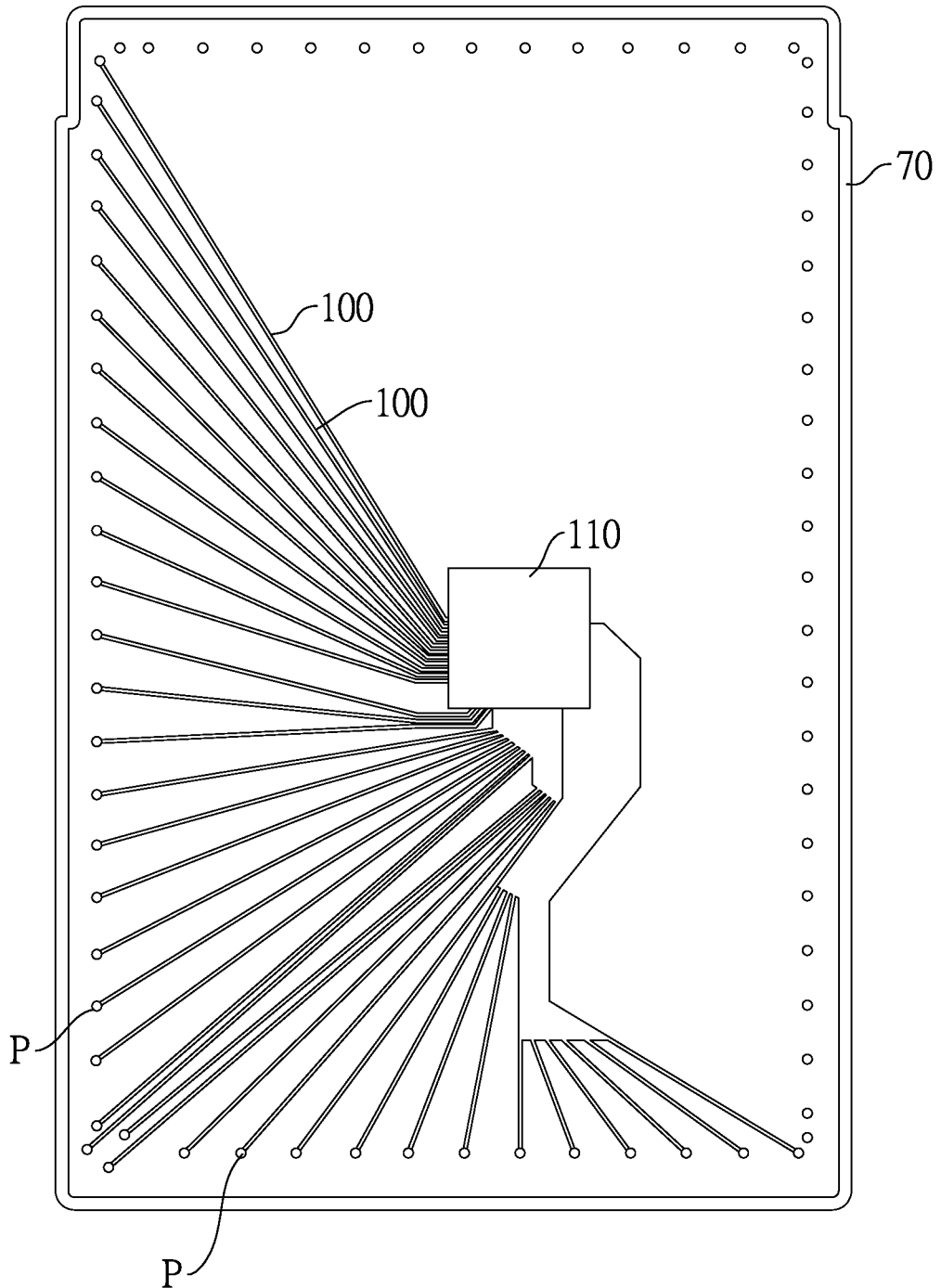
FIG. 8 is a bottom view of the conventional capacitive touch panel in FIG. 7A.
Figure 9A:
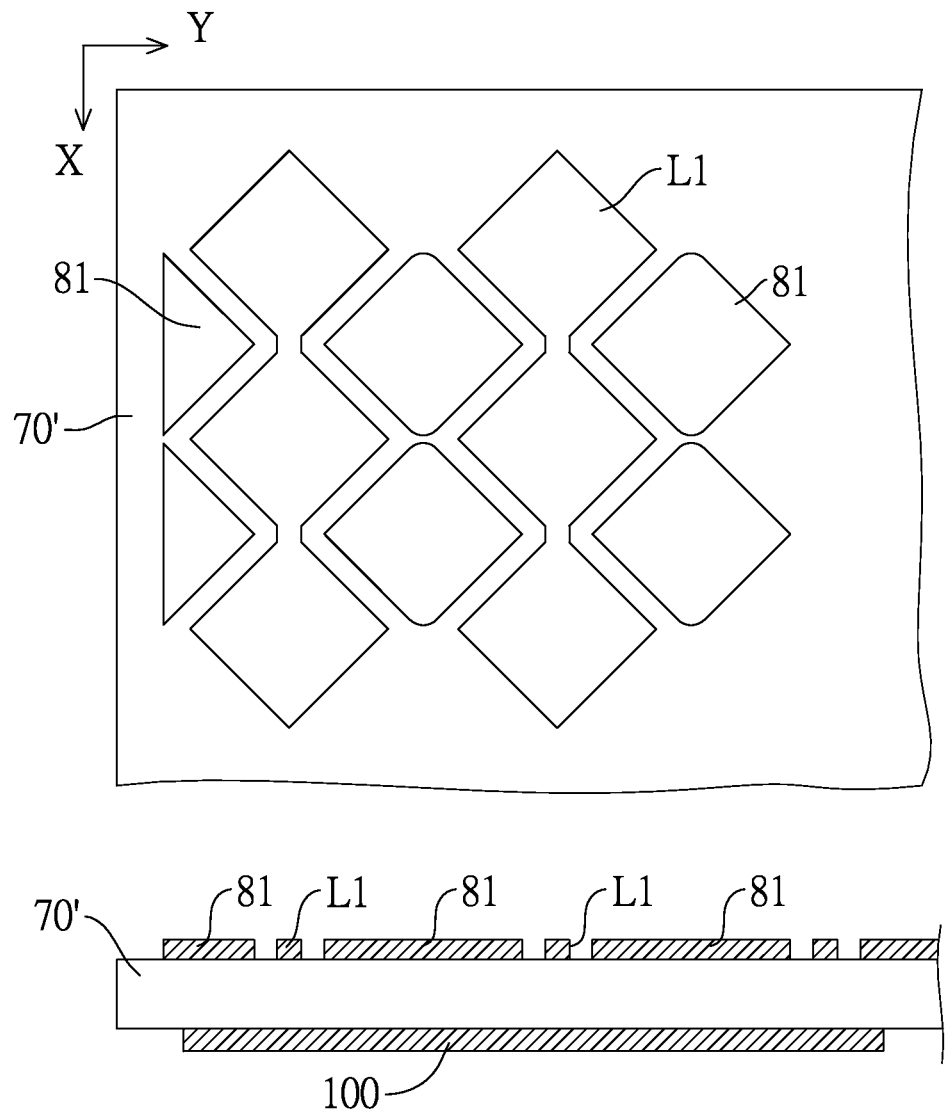
FIGS. 9A to 9C are partially enlarged top views and cross-sectional side views of a conventional capacitive touch panel with a double-layer substrate during different manufacturing processes.
Figure 9B:
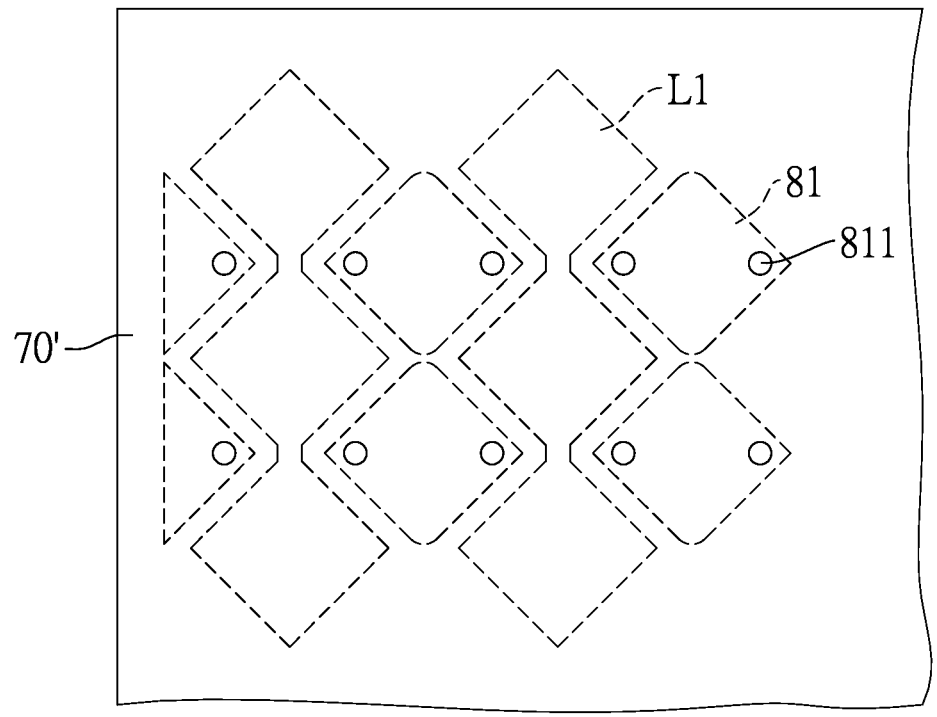
Figure 9B:
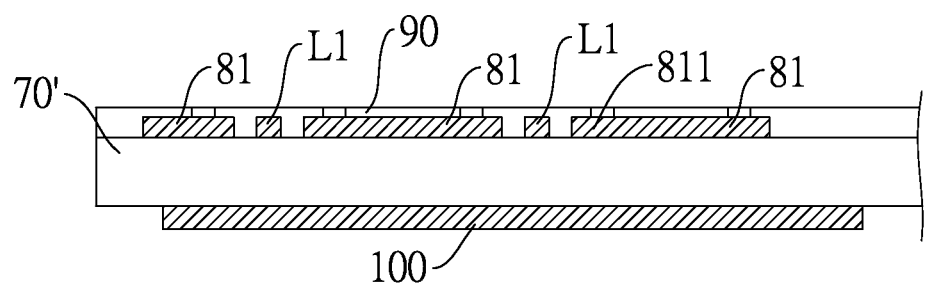
Figure 9C:
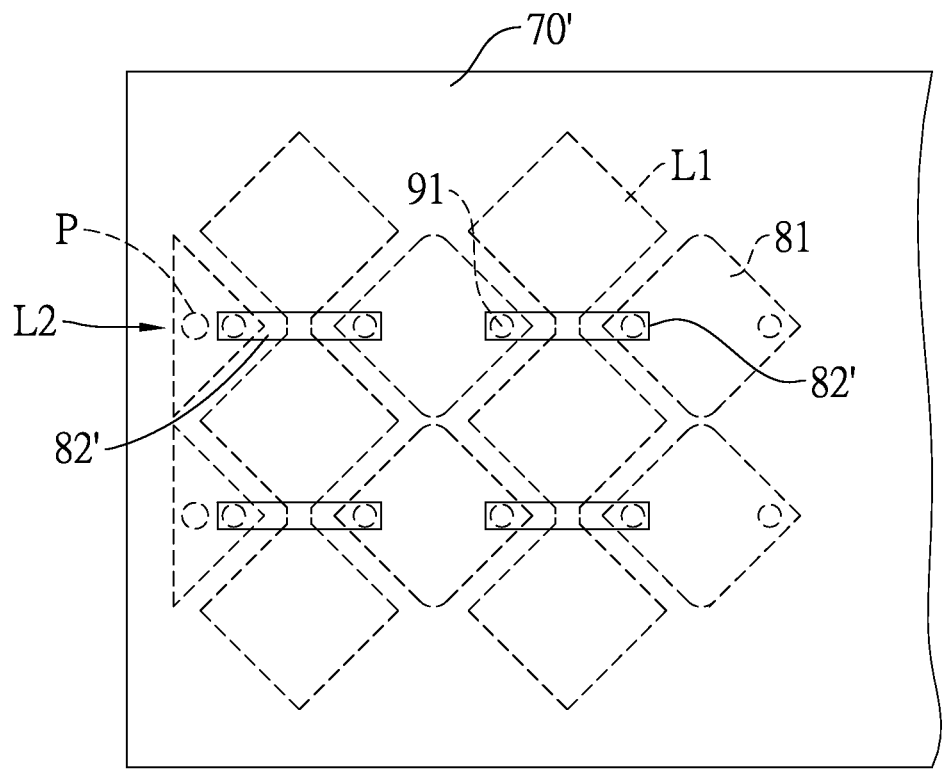
Figure 9C:
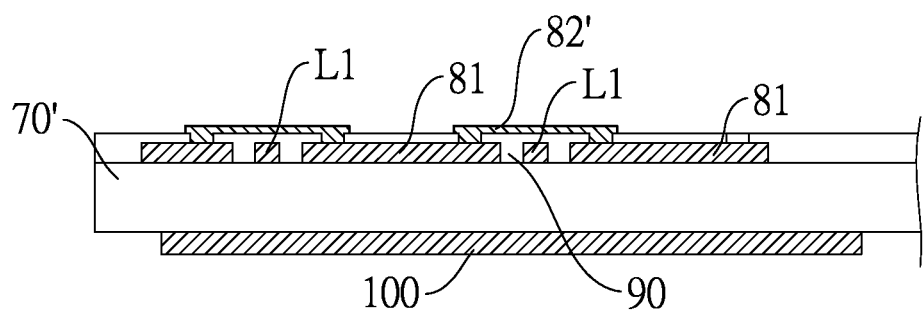

With reference to FIG. 6, when the first conductive vias P1 are formed by the CPTH process, each first conductive via P1 extends outwards from the two opposite surfaces of the substrate 10, and a protection layer 60 is further formed on the protruding portion. A total thickness d3 of the protruding portion along with the protection layer for the first conductive via P1 is about 0.075 mm, which is thicker than the protruding portion of the first conductive vias P1 formed by the PTH process. However, as the LQFP controller or TQFP controller 50 is adopted, a distance d2, approximately 0.1 mm, between the bottom surface of the package of the LQFP controller or TQFP controller 50 and the surface of the substrate 10 is still available. There is sufficient space for the at least one first conductive via P1 to be formed under the bottom surface of the LQFP controller or TQFP controller 50, and it does not require plenty of space to route the first conductor traces 32 in connection with the at least one first conductive via P1. Accordingly, automatic routing software can be employed to route the first-axis sensing lines L1, the second-axis sensing lines L2, and the at least one set of connection circuit 40 of the double-layer PCB 1 as shown in FIGS. 2 and 4.

With further reference to FIG. 2, multiple first-axis sensing lines L1 are parallelly formed on one of the two opposite surfaces of the substrate 10 of the double-layer PCB 1 and aligned in the X-axis direction, and multiple second-axis sensing units 31 are formed on the surface of the substrate 10 with each second-axis sensing unit 31 located between corresponding first-axis sensing units of adjacent two of the first-axis sensing lines L1. Preferably, except the outermost second-axis sensing units 31 adjacent to a boundary of the substrate 10, each second-axis sensing unit 31 corresponds to two of the first conductive vias P1. With further reference to FIGS. 3 and 4, any two of the first conductive vias P1 on the other surface of the substrate 10 corresponding to adjacent two of the second-axis sensing units 31 are connected with each other by one of the second conductor traces 32. Accordingly, the second-axis sensing units 31 are mutually connected by the second conductor traces 32 and the first conductive vias P1 to form the second-axis sensing lines L2.

In sum, as the manufacturing method of the capacitive touch panel of the present invention does not require multi-layer circuit board and eliminates the step of forming carbon conductor, the capacitive touch panel of the present invention is thinner than those using multilayer circuit board and the material cost of the carbon conductor can be saved. More importantly, the present invention adopts the LQFP controller or TQFP controller to have sufficient space so that the first conductive vias corresponding to the bottom surface of the controller can be formed without effort-taking routing of the second conductor traces connected between the first conductive vias. Accordingly, automatic routing software can still be employed to route the layout of a double-layer PCB to reduce the time for manufacturing the touch panel and accelerate production of the touch panel.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for manufacturing a capacitive touch panel, comprising steps of:
    providing a substrate, and delimiting at least one preset zone on the substrate, wherein the substrate has two surfaces opposite to each other;
    forming multiple first-axis sensing units and multiple second-axis sensing units on one of the surfaces of the substrate with the first-axis sensing units mutually connected with carbon conductors to form multiple first-axis sensing lines;
    forming at least one set of connection circuit and at least one die pad on the other surface of the substrate, wherein the at least one die pad corresponds to the at least one preset zone;
    forming multiple first conductive vias through the substrate, wherein at least one of the first conductive vias is located within the preset zone, and the second-axis sensing units are connected by the first conductive vias to form multiple second-axis sensing lines; and
    bonding a controller with an LQFP (Low Profile Quad Flat) package or a TQFP (Thin Quad Flat) package on the at least one die pad within the preset zone.

2. The method as claimed in claim 1, wherein in the step of forming multiple first conductive vias, the first conductive vias are fabricated by a plated through hole process or a copper plated through hole process.

3. The method as claimed in claim 1, wherein in the step of forming at least one set of connection circuit and at least one die pad, multiple second conductor traces are further formed to be connected between adjacent two of the first conductive vias.

4. The method as claimed in claim 2, wherein in the step of forming at least one set of connection circuit and at least one die pad, multiple second conductor traces are further formed to be connected between adjacent two of the first conductive vias.

5. The method as claimed in claim 3, wherein in the step of forming multiple first conductive vias through the substrate, multiple second conductive vias are formed through the substrate and each second conductive via connected to one end of a corresponding first-axis sensing line and one end of a corresponding set of connection circuit.

6. The method as claimed in claim 4, wherein in the step of forming multiple first conductive vias through the substrate, multiple second conductive vias are formed through the substrate and each second conductive via connected to one end of a corresponding first-axis sensing line and one end of a corresponding set of connection circuit.

7. The method as claimed in claim 5, wherein in the step of forming multiple first-axis sensing units and multiple second-axis sensing units, each second-axis sensing unit is located between corresponding first-axis sensing units of adjacent two of the first-axis sensing lines.

8. The method as claimed in claim 6, wherein in the step of forming multiple first-axis sensing units and multiple second-axis sensing units, each second-axis sensing unit is located between corresponding first-axis sensing units of adjacent two of the first-axis sensing lines.

9. A capacitive touch panel, comprising:
a substrate having a first surface and a second surface, and delimiting at least one preset zone, wherein at least one set of connection circuit and at least one die pad are formed on the second surface of the substrate, and the at least one die pad corresponds to the at least one preset zone;
multiple first-axis sensing lines formed on the first surface of the substrate, each first-axis sensing line formed by multiple first-axis sensing units connected to one another;
multiple second-axis sensing units formed on the first surface of the substrate;
multiple first conductive vias formed through the substrate to correspond to the second-axis sensing units, and connected to corresponding second-axis sensing units to form multiple second-axis sensing lines, wherein at least one of the first conductive vias is respectively located within the at least one preset zone; and
a controller with an LQFP package or a TQFP package bonded on the at least one die pad and connected with the at least one set of connection circuit.

10. The capacitive touch panel as claimed in claim 9, wherein the first conductive vias are plated through holes or copper plated through holes.

11. The capacitive touch panel as claimed in claim 9, wherein multiple carbon conductors are formed on the second surface with each carbon conductor connected between adjacent two of the first conductive vias.

12. The capacitive touch panel as claimed in claim 10, wherein multiple carbon conductors are formed on the second surface with each carbon conductor connected between adjacent two of the first conductive vias.

13. The capacitive touch panel as claimed in claim 9, wherein multiple second conductive vias are formed through the substrate and each second conductive via corresponding to an end of a corresponding first-axis sensing line and connected to a corresponding set of connection circuit.

14. The capacitive touch panel as claimed in claim 9, wherein each second-axis sensing unit is located between corresponding first-axis sensing units of adjacent two of the first-axis sensing lines.

* * * * *